United States Patent [19]

Andrew et al.

[11] Patent Number: 4,797,240

[45] Date of Patent: Jan. 10, 1989

[54] COMPOSITION AND METHOD FOR PREVENTING THE STAINING OF NITROCELLULOSE FINISHED SHOE UPPERS ATTACHED TO POLYURETHANE SHOE SOLES

[75] Inventors: Gary D. Andrew, Walnutport; Edward A. Galla, Macungie; Robert L. Ricci, Allentown, all of Pa.

[73] Assignee: Air Products and Chemicals, Inc., Allentown, Pa.

[21] Appl. No.: 58,963

[22] Filed: Jun. 8, 1987

[51] Int. Cl.$^4$ .............................................. C08G 18/14
[52] U.S. Cl. ........................................ 264/46.4; 36/28; 264/54; 264/244; 521/107; 521/168
[58] Field of Search ...................... 264/54, 46.4, 244, ; 521/107, 168; 36/28

[56] References Cited

U.S. PATENT DOCUMENTS

| | | | |
|---|---|---|---|
| 3,661,811 | 5/1972 | Hardy et al. | 264/54 X |
| 3,814,781 | 6/1974 | Oka et al. | 264/54 |
| 4,486,370 | 12/1984 | Beclara et al. | 264/53 |
| 4,616,044 | 10/1986 | Fesman | 521/107 |

*Primary Examiner*—Philip Anderson
*Attorney, Agent, or Firm*—Michael Leach; William F. Marsh; James C. Simmons

[57] ABSTRACT

To prevent the staining of a nitrocellulose coated shoe upper by a polyurethane shoe sole prepared from a mixture comprising a polyisocyanate, a polyol, a chain extender, a tertiary amine catalyst, a surfactant and water, an effective amount of a reactive organic halogen compound, preferably a halogenated fire retardant, is added.

16 Claims, No Drawings

COMPOSITION AND METHOD FOR PREVENTING THE STAINING OF NITROCELLULOSE FINISHED SHOE UPPERS ATTACHED TO POLYURETHANE SHOE SOLES

TECHNICAL FIELD

The present invention relates to urethane compositions for use in the production of polyurethane shoe soles.

BACKGROUND OF THE INVENTION

The application of urethane technology to produce polyurethane shoe soles attached to uppers coated with nitrocellulose-containing finish is widely known. Shoe producers are very interested in producing this type of shoe because of the desirable feel and style associated with nitrocellulose coated uppers. However, when a nitrocellulose finished upper is attached to a polyurethane sole, a yellowing or discoloration of the nitrocellulose finished upper occurs. This yellowing, or staining, is most noticeable when white shoes are produced but can be seen with all colors of nitrocellulose coated uppers.

Tertiary amines are customarily used as catalysts in polyurethane shoe sole compositions. Normally the catalyst is blended with the polyol, surfactant and water, which blend in turn is reacted with the polyisocyanate to produce polyurethane shoe soles. Triethylenediamine is used widely and most predominantly by the shoe sole industry. The molecular structure and size of the triethylenediamine molecule permits the catalyst to be highly mobile and "move" throughout the polymer ensuring complete catalysis. The added green strength allows the shoe sole molders to demold the soles quickly.

It has been discovered that the heat produced in the curing of the sole causes the amine to volatilize and migrate to the surface, attacking the nitrocellulose coated part causing the nitrocellulose staining.

One attempt at solving the staining problem focused on using catalysts that contain a reactive hydroxyl functionality. The reactive hydroxyl group would react into the polymer network and not permit migration to the surface, thus eliminating the attack of the nitrocellulose. However, the decreased reactviity of this type of catalyst resulted in extended demold times to a point where it became economically unfeasible because of increasd production cost. Demold times were extended from 3 minutes to about 7 or 8 minutes when using such relative catalysts. In addition, the physical properties of the polyurethane shoe soles were also negatively affected.

At present, manufacturers are warned against the use of nitrocellulose-containing finishes on shoe uppers with polyurthane shoe soles as the only acceptable method to avoid a staining problem.

U.S. Pat. No. 4,486,370 discloses the addition of a small amount of a halogen compound, e.g. chloroethyl phosphate, in a process for producing elastomeric poluyrethane RIM parts using tertiary amines as the chief catalyst component results in scavenging the residual amines after the part has been cured by annealing. The parts from such a process can be coated with a wide variety of enamels and completely cured to result in a higher degree of adhesion between the coating and the surface of the part compared to those parts from a process not using such a halogen compound.

SUMMARY OF THE INVENTION

In accordance with the present invention, there is provided a composition for producing polyurethane shoe soles which do not cause staining of the nitrocellulose coated shoe uppers to which the shoe soles are attached. The polyurethane composition comprises a reactive mixture of an organic polyisocyanate, a polyether or polyester polyol, a low molecular weight chain extender, a tertiary amine catalyst, a surfactant, water and at least one reactive organic halogen compound present in an amount effective to prevent the staining of the nitrocellulose coated uppers.

DETAILED DESCRIPTION OF THE INVENTION

It has been found that polyurethane shoe soles which do not cause staining of the attached nitrocellulose uppers can be prepared. The polyurethane foam shoe sole compositions employed in this invention can be prepared by conventional polyurethane molding technology. The polyurethane composition should include as basic ingredients: an organic polyisocyanate, a high molecular weight polyether or polyester polyol, a low molecular weight chain extender, a tertiary amine catalyst for the urethane reaction, a surfactant, water and at least one organic halogen compound additive effective to prevent the staining of an attached nitrocellulose coated upper.

The ogranic polyisocyanate ingredient of the polyurethane composition can be selected from conventional isocyanates used for making polyurethane shoe soles. Examples of suitable polyisocyanates are hexamethylene diisocyanate, phenylene diisocyanate, toluene diisocyanate, and 4,4'-diphenylmethane diisocyanate. Especially suitable are teh 2,4- and 2,6-toluene diisocyanates individually or together as their commercially available mixtures. Other suitable mixtures of diisocyanates are those known commercially as "crude MDI", also known as PAPI, which contain about 60% of 4,4'-diphenylmethane diisocyanate along with other isomeric and analogous higher polyisocyanates. Also suitable are "prepolymers" of these polyisocyanates composing a partially pre-reacted mixture of polyisocyanates and polyether or polyester polyol.

The polyther polyol component for the composition of this invention can be selected from any of the wide variety of polyhydric polyether compounds available and conventionally used in the art for the preparation of polyurethane shoe soles. The polyether polyols inlcude the poly(alkylene oxide) polymers such as poly(ethylene oxide) and poly(propylene oxide) polymers and copolymers with terminal hydroxyl groups derived from polyhydric compounds including diols and triols, for example, among others, ethylene glycol, propylene glycol, 1,3-butanediol, 1,4-butane-diol, 1,6-hexanediol, neopentyl glycol, diethylene glycol, dipropylene glycol, pentaerythritol, glycerol, diglycerol, trimethylolpropane, cyclo-hexanediol and like low molecular weight polyols.

Useful polyester polyols include those produced by reacting a dicarboxylic acid with an excess of a diol for example, adipic acid with ethylene glycol or butanediol, or reacting a lactone with an excess of a diol such as caprolactone and propylene glycol.

The polyether and polyester polyols used in the present invention preferably have molecular weights from about 1000 to 3000 and desirably from about 1800 to 2200 and have an average hydroxy functionality from about 15 to 80. There are several commercially available examples of these polyols including those sold under the trademarks WITCO E2457, Bayflex 2002H and Desmophen 3900.

In addition, the polyurethane shoe sole compositions contain, per hundred parts high molecular weight polyol 2, to 20 parts of a chain extender which is a low molecular weight diol such as ethylene glycol or 1,4-butanediol.

The polyurethane catalyst can be selected from conventional materials. Suitable catalysts include tertiary amines such as triethylenediamine, the most preferred catalyst for shoe sole compositions.

The blowing agent can comprise water alone or water in combination with other conventional blowing agents, such as methylene chloride, or hydrocarbons or fluorocarbons having a boiling point from about $-30°$ to $60°$ C.

The polyurethane foam composition would also contain a surfactant, or cell stabilizer, that is conventionally used in such compositions. The silicone surfactants are particularly used.

A general polyurethane formulation suitable for shoe soles would comprise one of the following:

| | pbw |
|---|---|
| POLYETHER POLYURETHANE FORMULATION | |
| Polyether Polyol | 100 |
| Crosslinker (butanediol) | 5-15 |
| Water | 0-0.4 |
| Cell Stabilizer | 0-0.3 |
| Halocarbon Blowing Agent | 2-8 |
| Organometallic Catalyst (dibutyltin dilaurate) | 0-0.1 |
| Tertiary Amine (Triethylenediamine) | 0.3-0.6 |
| Quaternary Ammonium Salt | 0.03-0.12 |
| Isocyanate Prepolymer, free NCO % | 98-105 Index, 18-22% |
| POLYESTER POLYURETHANE FORMULATION | |
| Polyester Polyol | 100 |
| Crosslinker (ethylene glycol) | 5-15 |
| Water | 0-0.5 |
| Cell Stabilizer | 0-1 |
| Tertiary Amine (Triethylenediamine) | 0.3-0.6 |
| Quaternary Ammonium Salt | 0.03-0.25 |
| Isocyanate prepolymer, free NCO % | 96-104 Index, 18-22% |

The organic halogen compound employed in the above general polyurethane shoe sole compositions to prevent the nitrocellulose staining must be capable of eventually reacting with residual amines, but only after the molded part has been cured. In other words, the rate of reaction of the halogen compound with the amine should be substantially less than the rate of the polymerization reaction taking place in the formation of the urethane by the catalyzed reaction of organic polyisocyanate and polyol.

The amount of the organic halogen compound employed in the polyurethane formulation can range from 5 to 10 wt based on total urethane, preferably 6 to 8 wt %. At less than about 5 wt, yellowing is still evident and above 10 wt, the physical properties and system reactivities are reduced.

Among the organic halogen compounds that may be employed are the conventional halgenated flame retardant agents. The term "halogenated flame retardant" as used in the context of this invention includes halogenated hydrocarbons and halogenated organophosphorus compounds. The polyurethane flame retardants are used to deactivate the amine catalyst and not as a flame retardant. Other amine salts, such as organic acids, are not viable options. They quickly dissociate and the organic anion is consumed in the reaction. The haolgenated compounds are unique in that they deactivate the amine catalyst after, rather than before, the initial urethane reaction.

Suitable halogenated flame retardants are, e.g., tris(1,3-dichloropropyl)phosphate, tris(2,3-dibromoproply(phosphate, dichloromethylene-bis(di-e-chloroethyl)phosphate, tris(2-chloroethyl)phosphate, tris(2-chloropropyl)phosphate, 2,2-bis-(chloromethyl)-1,3-propylene, bis-di(2-chloroethyl)phosphate, bis(dichloropropyl(tribromoneopentylphosphate, tetrakis(2-chloroethyl)ethylene diphosphate, pentabromodiphenyl oxide, bis(pentabromophenoxy)ethane, bis(tetrabromophthalimide)ethane, tetrabromobisphenol A, hexabromocyclododecane, bis(tribromophenoxy)ethane, octabromodiphenyl oxide, tribromoneopentyl alcohol, chlorinated paraffin, brominated paraffin, chlorinated polyols, and mixtures thereof.

The organic halogen compound is added to the isocyanate where it is inert. In normal production the isocyanate/halogen compound blend would be reacted with the resin blend containing the other polyurethane components, including the amine catalyst. After the initial urethane reactions are completed, the halogen compound would react with the amine catalyst forming a halide salt. As a result the amine would be no longer active and could not react with the nitrocellulose, thus preventing the discoloration problem.

EXAMPLE 1

A study was done to determine the effect that tris(2-chloroethyl)-phosphate [TCEP] has on the shelf-life of the polyisocyanate. TCEP was tested in two polyisocyanates, U-235, a polyether polyisocyanate and E-501, a polyester polyisocyanate, both marketed by Mobay Chemicals. The TCEP and the polyisocyanate were mixed in various ratios with the percent NCO determined initially and after a one month storage period. It is important that the mixture not show a loss of active percent NCO since the TCEP is to be added directly to the polyisocyanate rather than to the resin side where it would deactivate the amine catalyst during storage. Table 1 shows there was essentially no loss of active percent NCO during a one month storage period.

TABLE 1

| TCEP | U-235 g | E-501 g | INITIAL % NCO | ONE MONTH ENDING % NCO |
|---|---|---|---|---|
| 0 g | 100 g | — | 22.7% | 22.6% |
| 10 g | 100 g | — | 20.5% | 20.4% |
| 20 g | 100 g | — | 18.2% | 18.2% |
| 30 g | 100 g | — | 17.3% | 17.3% |
| 40 g | 100 g | — | 16.1% | 16.0% |
| 50 g | 100 g | — | 15.0% | 15.0% |
| 0 g | — | 100 g | 19.0% | 18.8% |
| 10 g | — | 100 g | 17.0% | 17.0% |
| 20 g | — | 100 g | 15.7% | 15.7% |
| 40 g | — | 100 g | 13.6% | 13.4% |
| 50 g | — | 100 g | 12.2% | 12.2% |

The follow polyurethane shoe sole formulation was used in Examples 2 and 3:

EXAMPLE 2

| PREMIX | |
|---|---|
| Witco Fomrez E-2457[a] | 85.2 g |

-continued

| | | |
|---|---|---|
| 1,4 Butanediol | 13.5 g | |
| H₂O (Total) | 00.4 g | |
| DC-193 Surfactant[b] | 00.4 g | |
| Dabco ® Crystal[c] | 0.5 g | |
| ISOCYANATE | | |
| Isonate-240[d] | 98 Index | |

[a]A polyester polyol having a hydroxyl number of 55 marketed by Witco Chemical Co.
[b]A silicone surfactant marketed by Dow Corning.
[c]Triethylenediamine marketed by Air Products and Chemicals, Inc.
[d]4,4'-diphenylmethane diisocyanate prepolymer having 18–19% free NCO marketed by Upjohn.

Several halogenated fire retardants were tested to determine their ability to prevent staining.

The following test method was used to determine the effectiveness of the staining retardant; tests were performed in a closed container, 40g of the polyurethane plaque was exposed to a 1"×2" nitrocellulose-coated leather for 16 hours at 65° C. The following rating system was used to visually rate the samples:

4=No improvement of the staining problem
3=A very small improvement of the staining problem
2=Staining improved with only slight amount of yellowing
1=No sign of staining or yellowing The following flame retardants were tested:
Tris(2-chloroethyl) phosphate [TCEP]
Tris(propal) phosphate[a] [TPP]
Tetrakis(2-chloroethyl) ethylene diphosphate[b] [TCEEDP]
Phosphate, chloroalkylester [PCAE]

Each of the flame retardants was tested in the following formulations:

| g Premix | g Isocyanate | g Flame Retardant | % Flame Retardant |
|---|---|---|---|
| 150 | 139.5 | 0 | 0 |
| 150 | 139.5 | 7.0 | 2.42 |
| 150 | 139.5 | 15.5 | 5.35 |
| 150 | 139.5 | 20.3 | 7.00 |
| 150 | 139.5 | 24.6 | 8.50 |
| 150 | 139.5 | 34.9 | 12.05 |
| 150 | 139.5 | 59.8 | 20.66 |

The results of the staining test are shown in Table 2. It can be seen from the data that only the fire retardant materials that contained a chlorine atom were successful in preventing the nitrocellulose staining. At about 7 wt % flame retardant, based on total urethane, the staining problem is resolved.

TABLE 2

| % | TCEP | TPP | TCEEDP | PCAE |
|---|---|---|---|---|
| 0 | 4 | 4 | 4 | 4 |
| 2.42 | 3 | 4 | 2 | 3 |
| 5.35 | 2 | 4 | 1 | 1 |
| 7.00 | 1 | 4 | 1 | 1 |
| 8.50 | 1 | 3 | 1 | 1 |
| 12.05 | 1 | 4 | 1 | 1 |
| 20.66 | 1 | 4 | 1 | 1 |

EXAMPLE 3

The fire retardant TCEP was added at levels ranging from 0 to 25 wt%, based on total urethane, to the standard formulation and the foam product was evaluated for physical properties as well as reactivity data.

TABLE 3

| % TCEP | SECONDS CREAM | MINUTES DEMOLD | ROSS FLEX | TENSILE LBS/IN² | % ELONGATION | ABRASION mg/1000 CYCLE | TEAR STRENGTH LBS/IN | % COMPRESSION |
|---|---|---|---|---|---|---|---|---|
| 0% | 9 | 3.5 | 35,900 | 580 | 510 | 112 | 11 | 3.94 |
| 5% | 9 | 3.5 | 34,900 | 600 | 495 | 123 | 11 | 3.45 |
| 7% | 9 | 3.5 | 35,900 | 575 | 500 | 124 | 10 | 3.60 |
| 10% | 9 | 3.75 | 40,800 | 545 | 510 | 128 | 9 | 3.23 |
| 15% | 9 | 4.00 | 19,900 | 531 | 440 | 188 | 10 | 3.65 |
| 20% | 9 | 4.25 | 30,000 | 430 | 330 | — | 11 | 3.17 |
| 25% | 9 | 4.5 | 25,900 | 375 | 400 | 1630 | 14 | 5.82 |

The data in Table 3 shows that greater than about 10 wt % TCEP in the polyurethane shoe sole formulation adversely affected the reactivity and the physical properties of the shoe sole product. Thus, for TCEP as the additive for preventing nitrocellulose staining, the desired amount would range from 7 to about 8.5 wt %.

STATEMENT OF INDUSTRIAL APPLICATION

The invention provides a means for preparing polyurethane shoe soles which can be attached to nitrocellulose-coated shoe uppers without incurring the unsightly staining of the upper.

What is claimed is:

1. In a method for preparing a polyurethane shoe sole for attachment to a nitrocellulose-coated shoe upper which shoe sole is prepared by reacting a mixture comprising a polyisocyanate, a polyester or polyether polyol, a chain extender, a tertiary amine catalyst, a surfactant and water, the improvement which comprises adding a reactive organic halogen compound to the mixture in an amount of about 5–10 wt %, based on total urethane composition, to prevent the staining of the nitrocellulose coated shoe upper.

2. The method of claim 1 in which the reactive organic halogen compound is tris(2-chloroethyl) phosphate, tetrakis(2-chloroethyl) ethylene diphosphate, or phosphate, chloroalkyl ester.

3. The method of claim 1 in which the reactive organic halogen compound is tris(2-chloroethyl)phosphate.

4. The method of claim 3 in which the reactive organic halogen compound is added in an amount of about 6–8 wt %, based on total urethane composition.

5. In a polyurethane shoe sole composition comprising a polyisocyanate, a polyester or polyether polyol, a low molecular weight chain extender, a tertiary amine catalyst, a surfactant and water, the improvement which comprises a reactive organic halogen compound in an amount of about 5–10 wt %, based on total urethane composition, to prevent the staining of a nitrocellulose coated upper attached to the shoe sole.

6. The polyurethane shoe sole composition of claim 5 in which the reactive organic halogen compound is a halogenated flame retardant.

7. The polyurethane shoe sole composition of claim 5 in which the reactive organic halogen compound is a halogenated hydrocarbon or a halogenated organophosphorus compound.

8. The polyurethane shoe sole composition of claim 5 in which the reactive organic halogen compound is tris(2-chloroethyl) phosphate, tetrakis(2-chloroethyl) ethylene diphosphate, or phosphate, chloroalkyl ester.

9. The polyurethane shoe sole composition of claim 5 in which the reactive organic halogen compound is present at about 6–8 wt % based on total urethane composition.

10. In a polyurethane shoe sole composition comprising a polyisocyanate, a polyester or polyether polyol, a low molecular weight chain extender, triethylenediamine, a surfactant and water, the improvement which comprises a halogenated flame retardant in an amount of about 5–10 wt %, based on total urethane composition, to prevent staining of a nitrocellulose coated upper attached to the shoe sole.

11. The polyurethane shoe sole composition of claim 10 in which the halogenated flame retardant is a halogenated hydrocarbon or a halogenated organophosphorus compound.

12. The polyurethane shoe sole composition of claim 10 in which the halogenated flame retardant is tris(2-chloroethyl) phosphate, tetrakis(2-chloroethyl) ethylene diphosphate, or phosphate, chloroalkyl ester.

13. The polyurethane shoe sole composition of claim 10 in which the halogenated flame retardant is tris(2-chloroethyl) phosphate.

14. The polyurethane shoe sole composition of claim 10 in which the halogenated flame retardant is present at about 6–8 wt %, based on total urethane composition.

15. The polyurethane shoe sole composition of claim 11 in which the halogenated flame retardant is present at about 6–8 wt %, based on total urethane composition.

16. The polyurethane shoe sole composition of claim 13 in which the halogenated flame retardant is present at about 6–8 wt %, based on total urethane composition.

* * * * *